(12) United States Patent
Ruff et al.

(10) Patent No.: US 9,038,948 B2
(45) Date of Patent: May 26, 2015

(54) HEADREST ASSEMBLY

(75) Inventors: Stephen Ruff, Chasham (GB); Colin Pickett, Middlesex (GB); James Robert Lorbiecki, Old Dustin (GB)

(73) Assignee: Martin-Baker Aircraft Co. Ltd., Middlesex (GB)

( * ) Notice: Subject to any disclaimer, the term of this patent is extended or adjusted under 35 U.S.C. 154(b) by 298 days.

(21) Appl. No.: 13/813,403

(22) PCT Filed: Jul. 29, 2011

(86) PCT No.: PCT/GB2011/051446
§ 371 (c)(1),
(2), (4) Date: Jan. 30, 2013

(87) PCT Pub. No.: WO2012/013985
PCT Pub. Date: Feb. 2, 2012

(65) Prior Publication Data
US 2013/0187003 A1    Jul. 25, 2013

Related U.S. Application Data

(60) Provisional application No. 61/432,877, filed on Jan. 14, 2011.

(30) Foreign Application Priority Data

Jul. 30, 2010    (GB) ................... 1012872.6

(51) Int. Cl.
*B64D 25/02* (2006.01)
*B64D 25/06* (2006.01)
*B64D 25/10* (2006.01)

(52) U.S. Cl.
CPC ................ *B64D 25/10* (2013.01); *B64D 25/02* (2013.01)

(58) Field of Classification Search
CPC ........ B64D 25/02; B64D 25/04; B64D 25/06; B64D 25/10
See application file for complete search history.

(56) References Cited

U.S. PATENT DOCUMENTS 5,039,035 A  *  8/1991  Fitzpatrick ............. 244/122 AG
6,422,512 B1    7/2002  Lewis
(Continued)

FOREIGN PATENT DOCUMENTS

FR    2646592         11/1990
GB    2231482 A  *   11/1990

OTHER PUBLICATIONS

International Preliminary Report on Patentability dated Feb. 5, 2013 in International Patent Application No. PCT/GB2011/051446.
(Continued)

*Primary Examiner* — Philip J Bonzell
(74) *Attorney, Agent, or Firm* — Byrne Poh LLP

(57) ABSTRACT

A headrest assembly (1) for an ejection seat, comprising: a support mounting (2); and a pair of inflatable side beams (3), each attached at one end to the support mounting and spaced apart from one another, the side beams (3) being configured to be inflated from a stowed configuration to a deployed configuration in which the side beams extend from the support panel, the side beams (3) configured to deploy through: a capturing phase, during which the side beams are partially inflated from the stowed configuration such that they extend outwardly and upwardly from the support mounting and away from one another to surround the head of an occupant of the ejection seat toward a central location with respect to the support mounting.

25 Claims, 12 Drawing Sheets

(56) References Cited

U.S. PATENT DOCUMENTS

| | | |
|---|---|---|
| 6,422,513 B1 | 7/2002 | Lewis |
| 7,699,265 B2* | 4/2010 | Mastrolia ............... 244/122 AG |
| 7,878,452 B2* | 2/2011 | Mastrolia ............... 244/122 AG |
| 8,191,830 B2* | 6/2012 | Mastrolia ............... 244/122 AG |
| 8,714,589 B2* | 5/2014 | Santana-Gallego et al. .. 280/733 |
| 2009/0045285 A1* | 2/2009 | Mastrolia ............... 244/122 AG |
| 2010/0155535 A1* | 6/2010 | Mastrolia ............... 244/122 AG |
| 2011/0084167 A1* | 4/2011 | Mastrolia ............... 244/122 AG |
| 2013/0147242 A1* | 6/2013 | Santana-Gallego et al. ............... 297/216.12 |

OTHER PUBLICATIONS

International Search Report dated Oct. 17, 2011 in International Patent Application No. PCT/GB2011/051446.

Written Opinion of the International Searching Authority dated Oct. 17, 2011 in International Patent Application No. PCT/GB2011/051446.

* cited by examiner

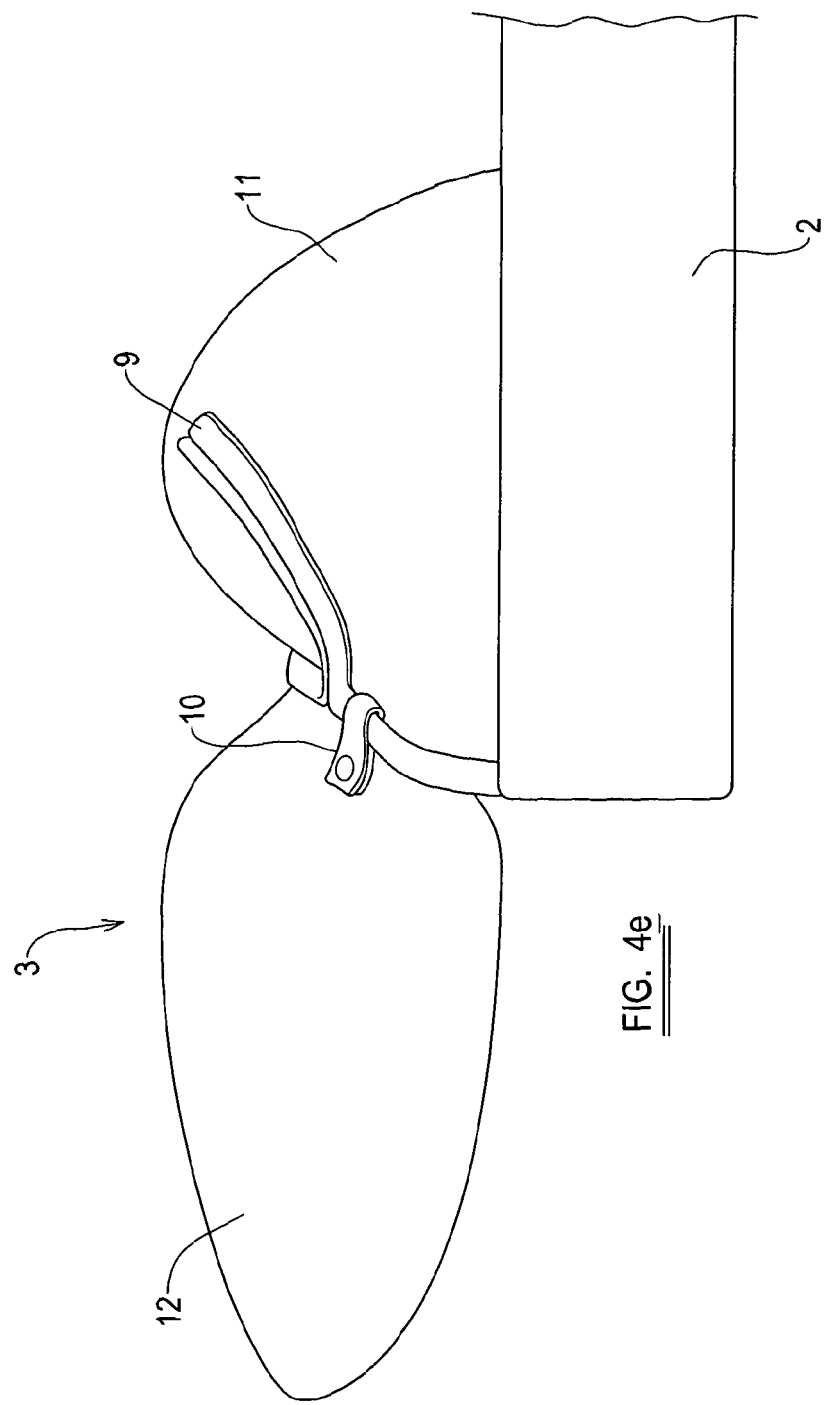

HEADREST ASSEMBLY

THE PRESENT INVENTION relates to a headrest assembly for an ejection seat.

As an ejection seat initiates an eject procedure, a rocket motor or other propulsion system causes the seat to be propelled upwardly out of the cockpit. A parachute subsequently deploys and the ejection seat and its occupant return to the ground safely.

Upon initiation of the ejection procedure, the sudden propulsion of the seat out of the cockpit imparts a significant force on the occupant, tending to cause the occupant's head to tilt downwards towards their chest. Especially where the occupant is female and has a small frame, the neck muscles may not be able adequately to resist the force to maintain the head upright. As the ejection seat subsequently exits the space of the cockpit, it enters into the wind blast passing over the cockpit, which imparts a sudden force on the pilot's head toward the head rest. The helmet and any ancillary items mounted on the helmet further increase the surface area facing the wind blast. As a result, the head is then caused suddenly, and often violently, to be pushed backwards into the headrest. This extent of this sudden travel of the head can cause injuries to the occupant.

Moreover, at the point of ejection—generally occurring at a point of emergency—the occupant might not be seated in the ejection seat in the optimal position. For example, the occupant might be leaning forwards in the seat, or the occupant's head might be angled with respect to the centre of the seat. Such undesirable positioning of the occupant's body or head is referred to as being "out of position".

It will be appreciated that if an ejection sequence is initiated when the seat occupant is out of position, the forces imparted by the wind blast may exacerbate the misalignment of the occupant with the seat, risking injury. In cases where the occupant's head is near the edge of the headrest, the windblast force could cause the occupant's head to move behind the plane of the head rest, risking serious injury.

Moreover, as the seat leaves the cockpit, there is a risk that an out-of-position occupant could strike the side of the cockpit or equipment in the cockpit, causing injury or, at the very least, adversely affecting the ejection path from the cockpit.

There is a need to ensure that an occupant of an ejection seat is maintained in or near an optimal position throughout the ejection procedure.

Accordingly, the present invention provides a headrest assembly for an ejection seat, comprising:
a support mounting; and
a pair of inflatable side beams, each attached at one end to the support mounting and spaced apart from one another,
the side beams being configured to be inflated from a stowed configuration to a deployed configuration in which the side beams extend from the support panel, the side beams configured to deploy through:
a capturing phase, during which the side beams are partially inflated from the stowed configuration such that they extend outwardly and upwardly from the support mounting and away from one another to surround the head of an occupant of the ejection seat toward a central location with respect to the support mounting.

The present invention further provides a headrest assembly and ejection seat as claimed.

Embodiments of the present invention will now be described, by way of non-limiting example only, with reference to the accompanying figures, in which.

Figure 3A:
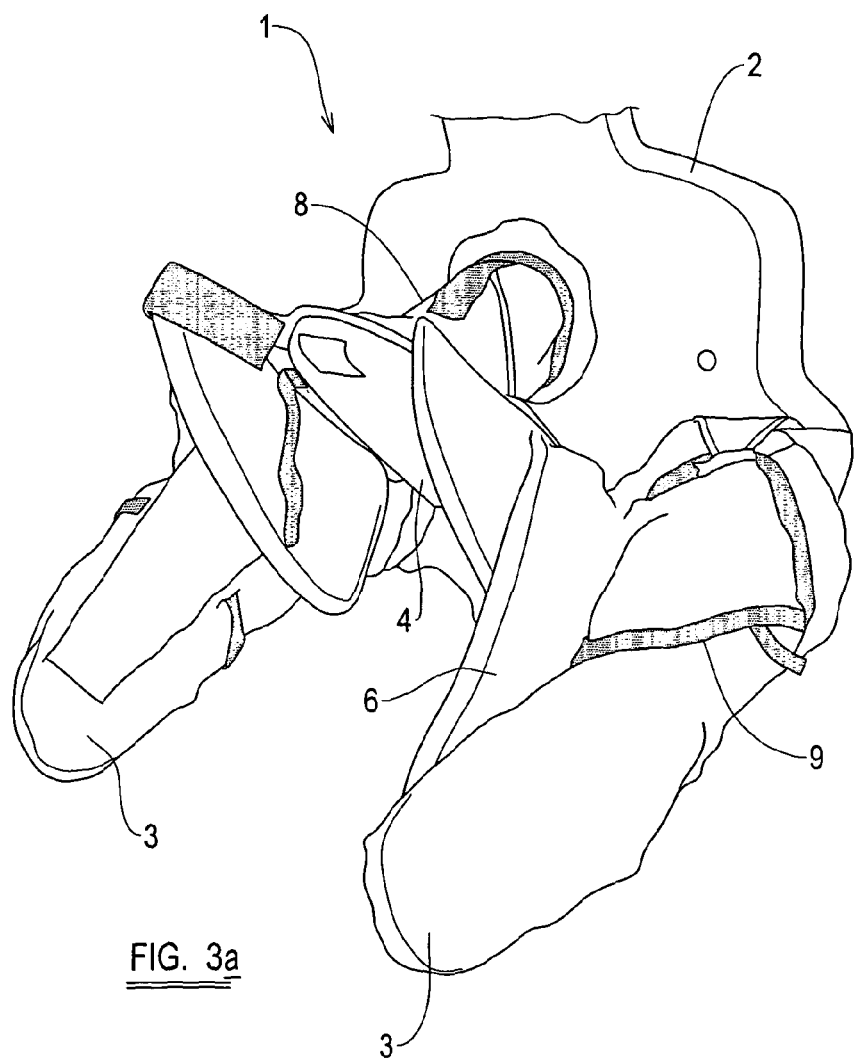
Figure 3B:
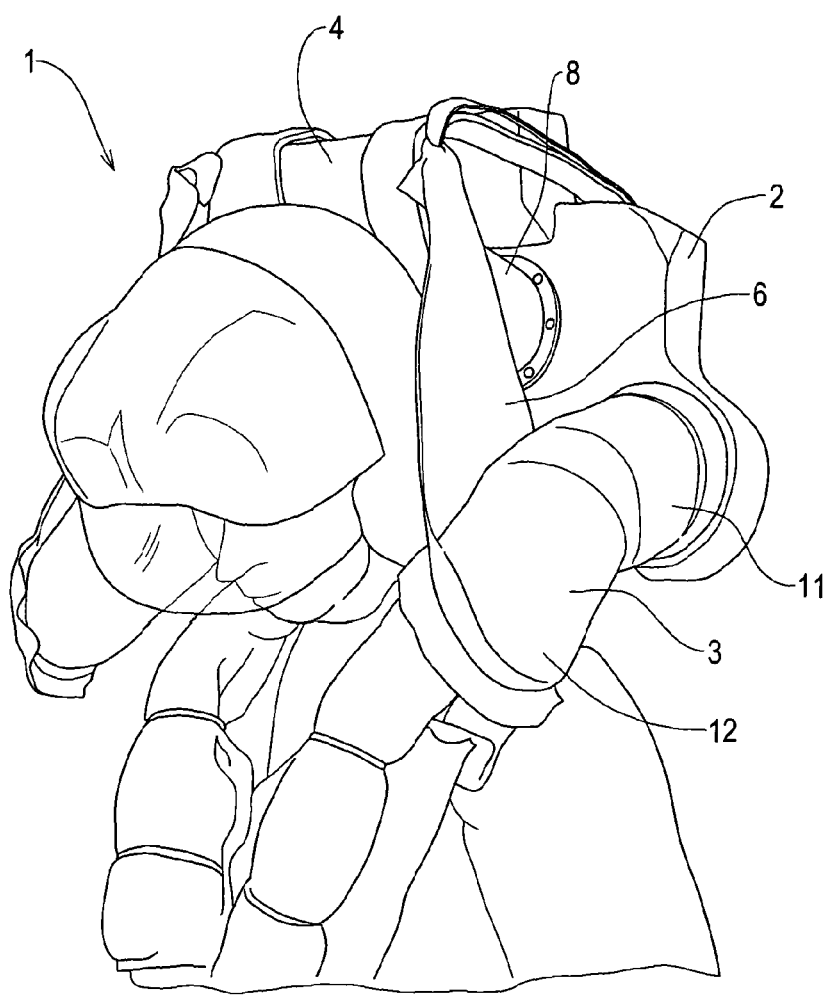
Figure 3C:
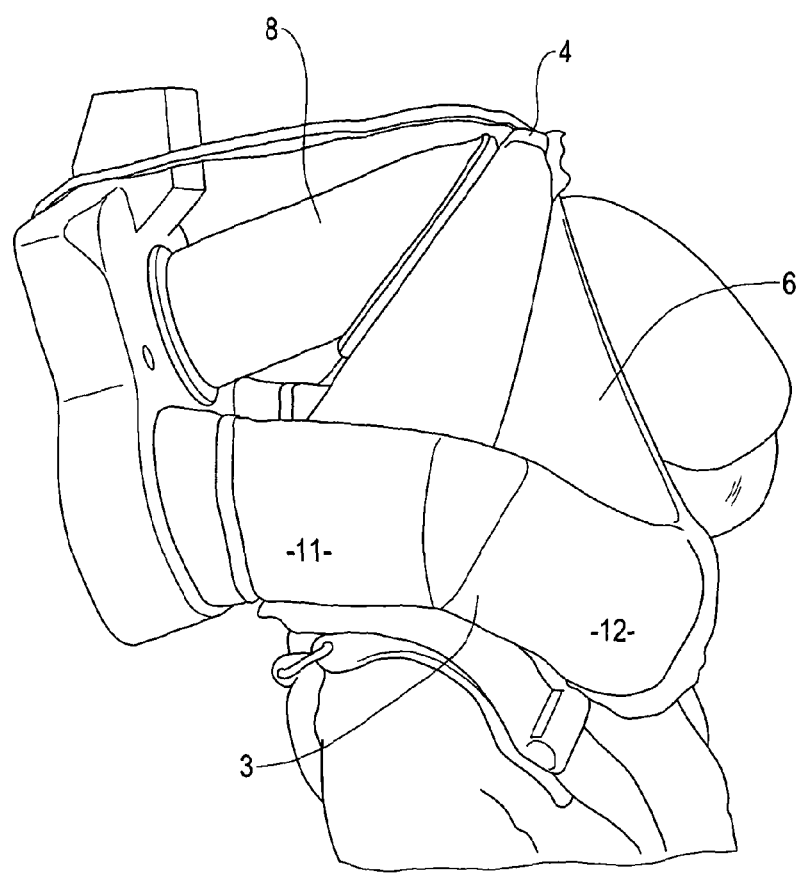
Figure 4A:
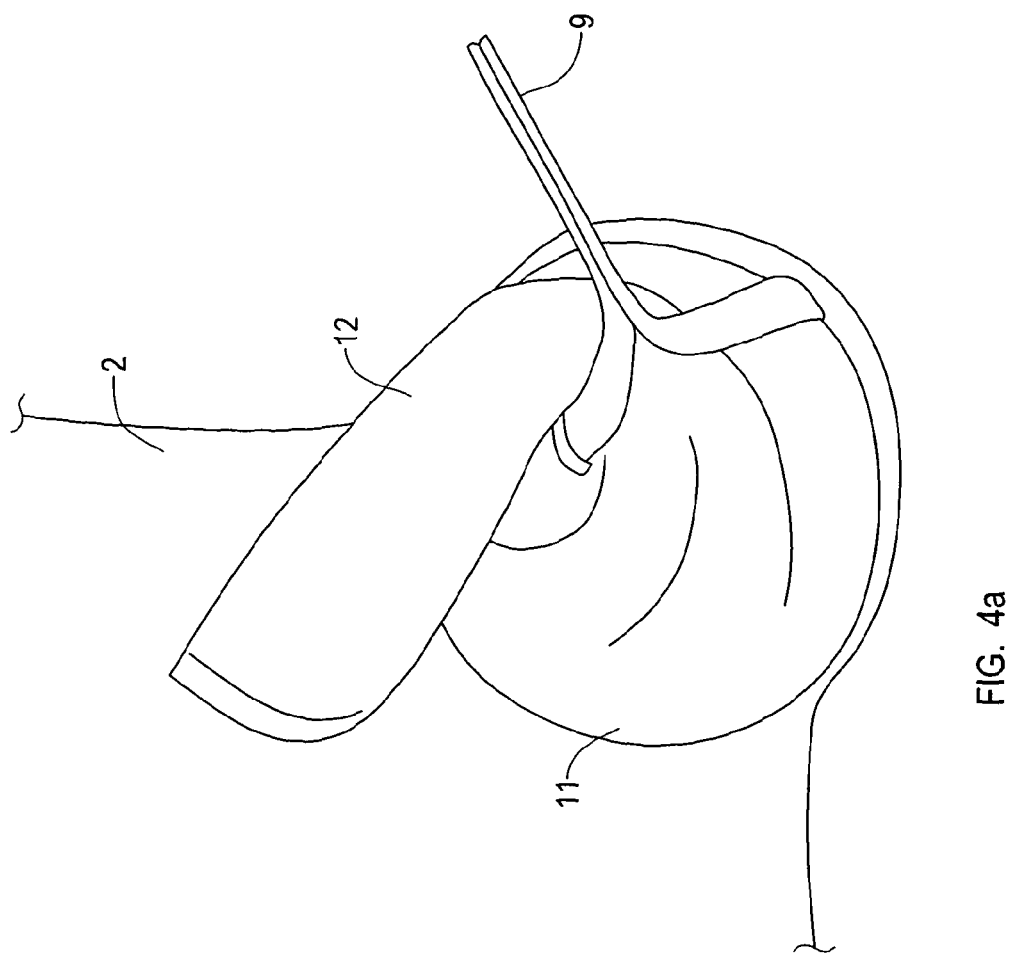
Figure 4B:
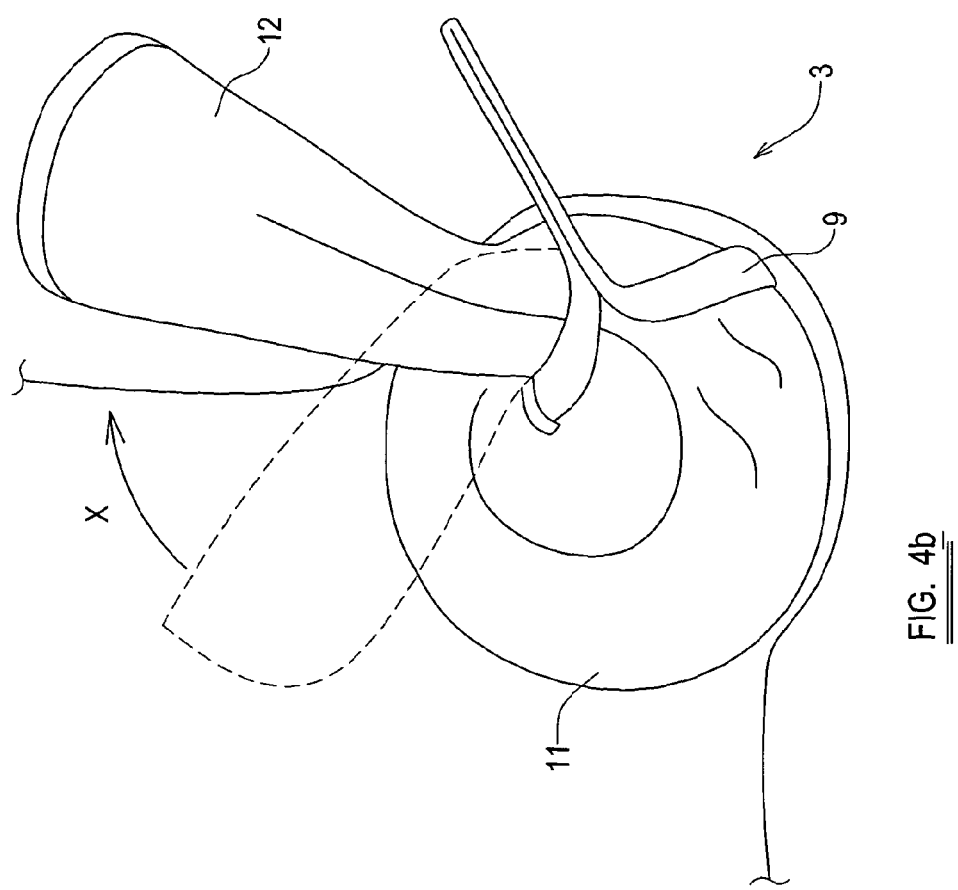
Figure 4C:
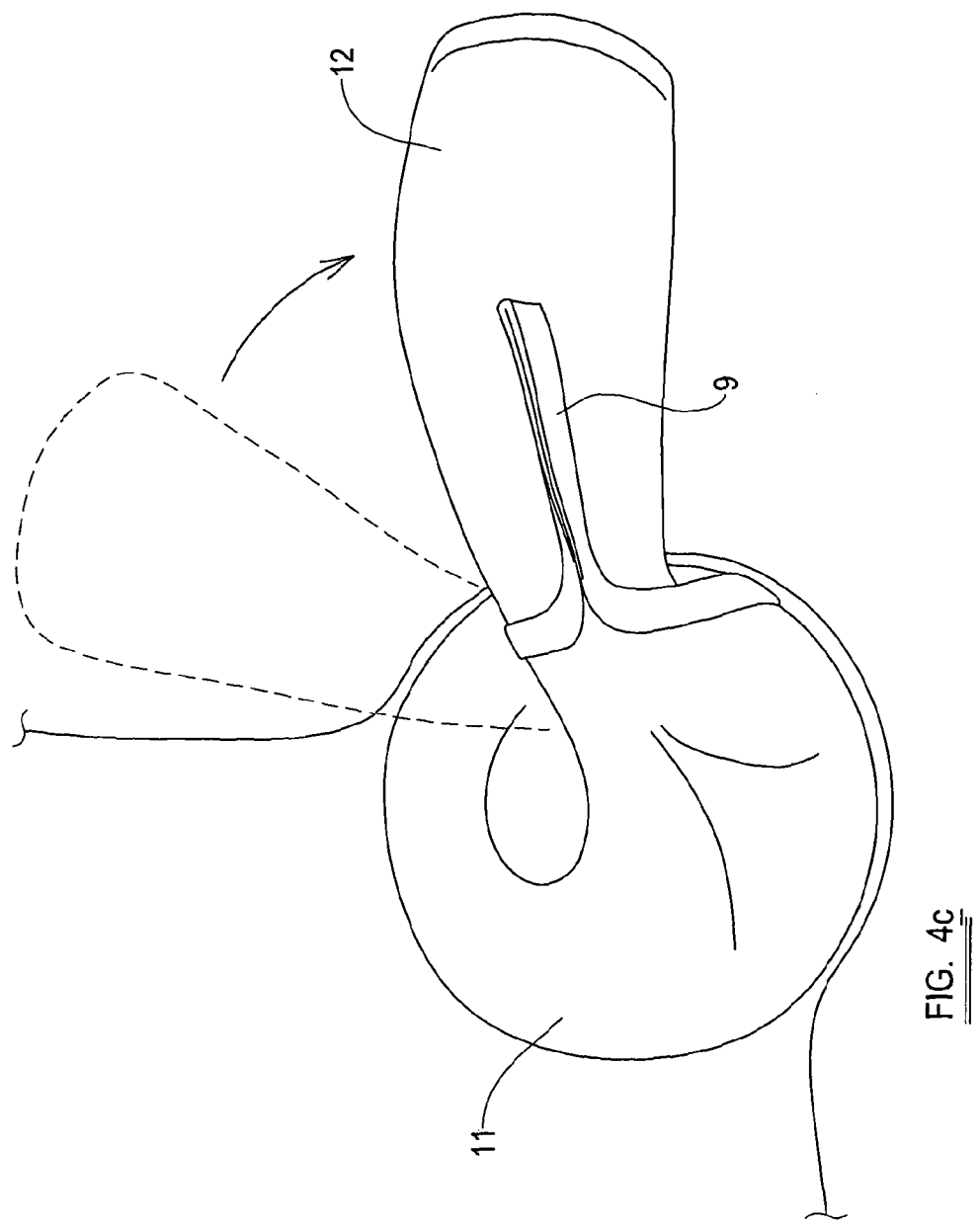
Figure 4D:
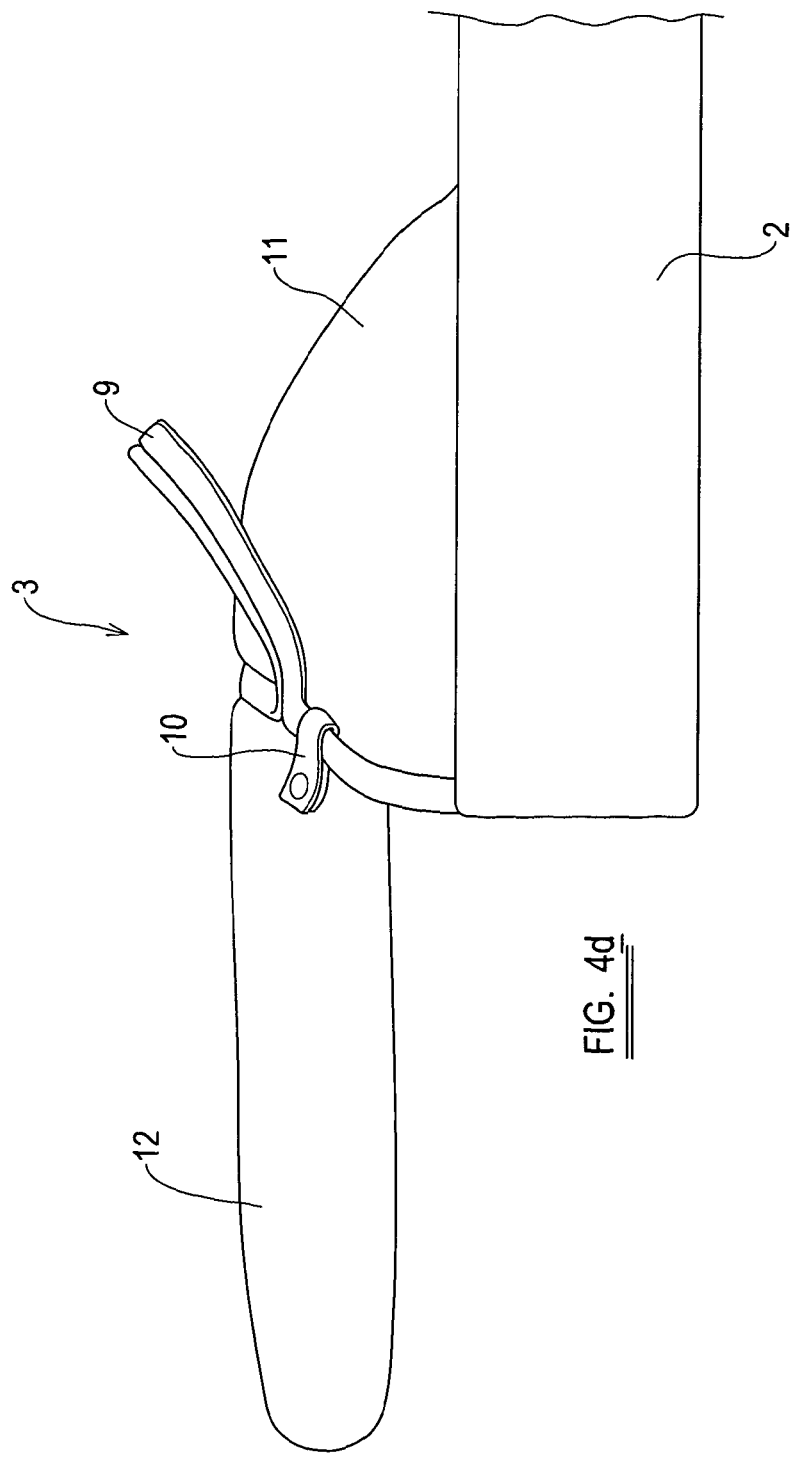
Figure 4F:
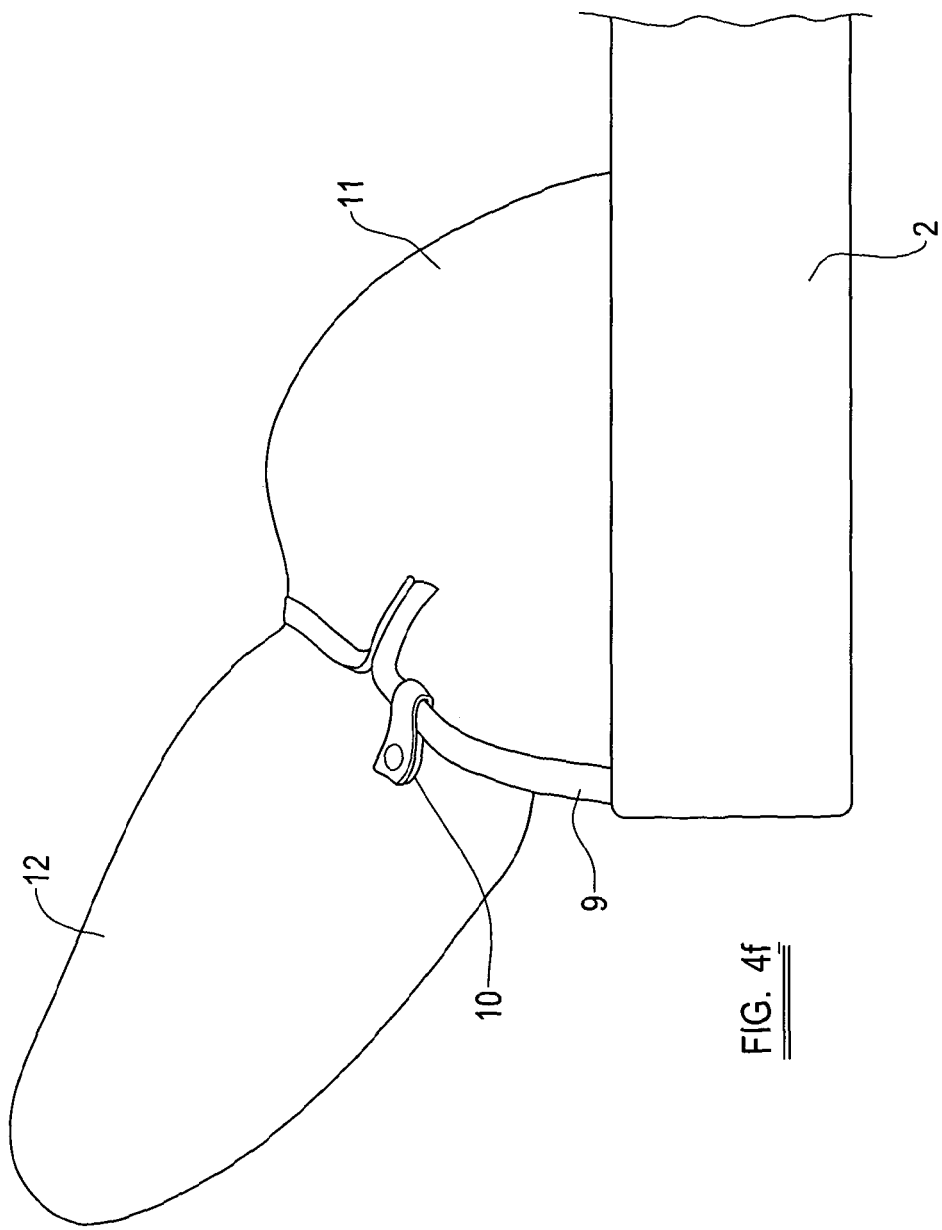
Figure 4G:
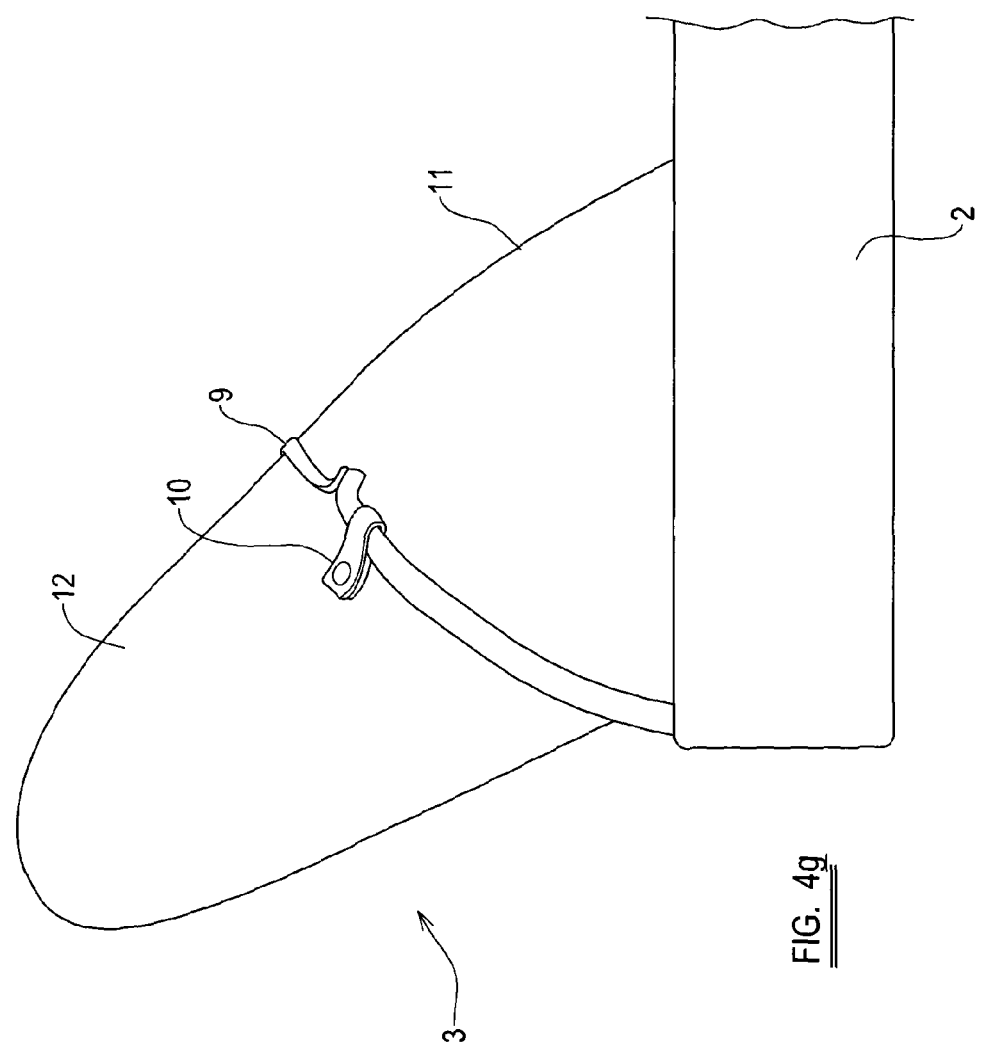

FIGS. 3A-3C illustrates a headrest assembly with the side beams and head beam extended; and FIGS. 4A-4G are schematic illustrations of the deployment of a side beam of the headrest. FIGS. 4A-4C are front views of the side beam. FIGS. 4E-4G are top views of the side beam, looking along the plane of the support structure.

Figure 1:
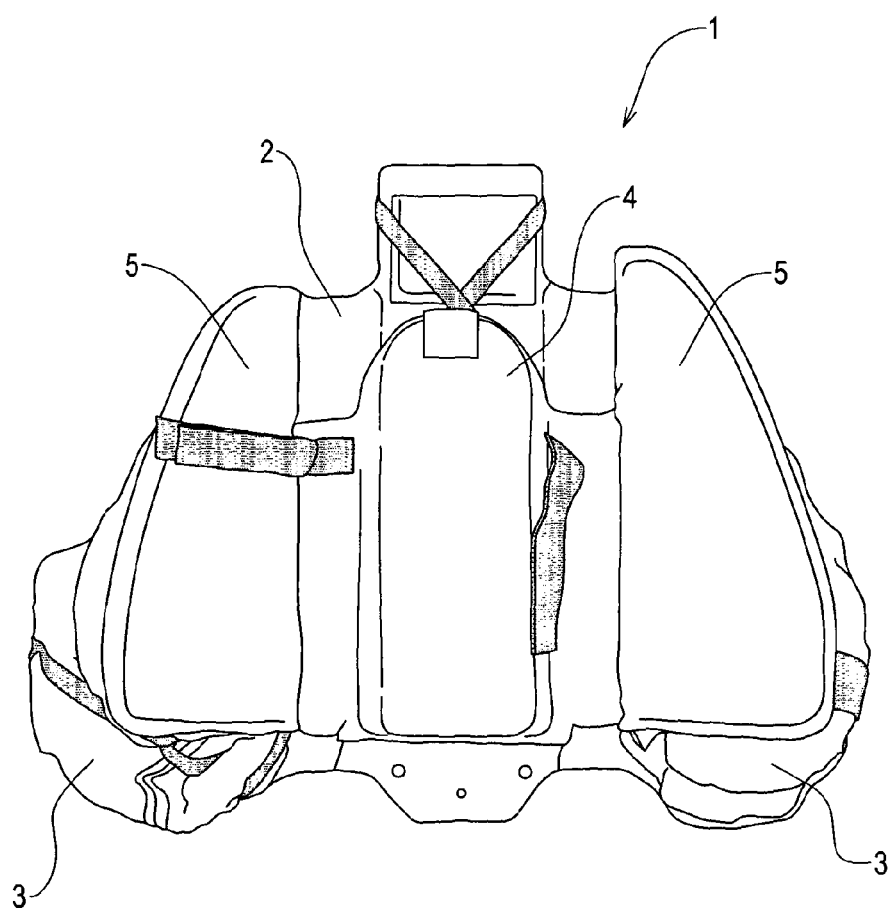
FIG. 1 illustrates a headrest assembly embodying the present invention substantially in a stowed configuration.

FIG. 1 illustrates a headrest assembly 1 for an ejection seat, embodying the present invention. The headrest assembly 1 comprises a support mounting 2 having a front substantially planar surface. The rear (not shown) of the support mounting 2 provides a housing in which various components of an ejection seat may be stowed (e.g. parachute, gas supply etc). The headrest assembly 1 is attachable to an ejection seat (not shown).

Figure 2:
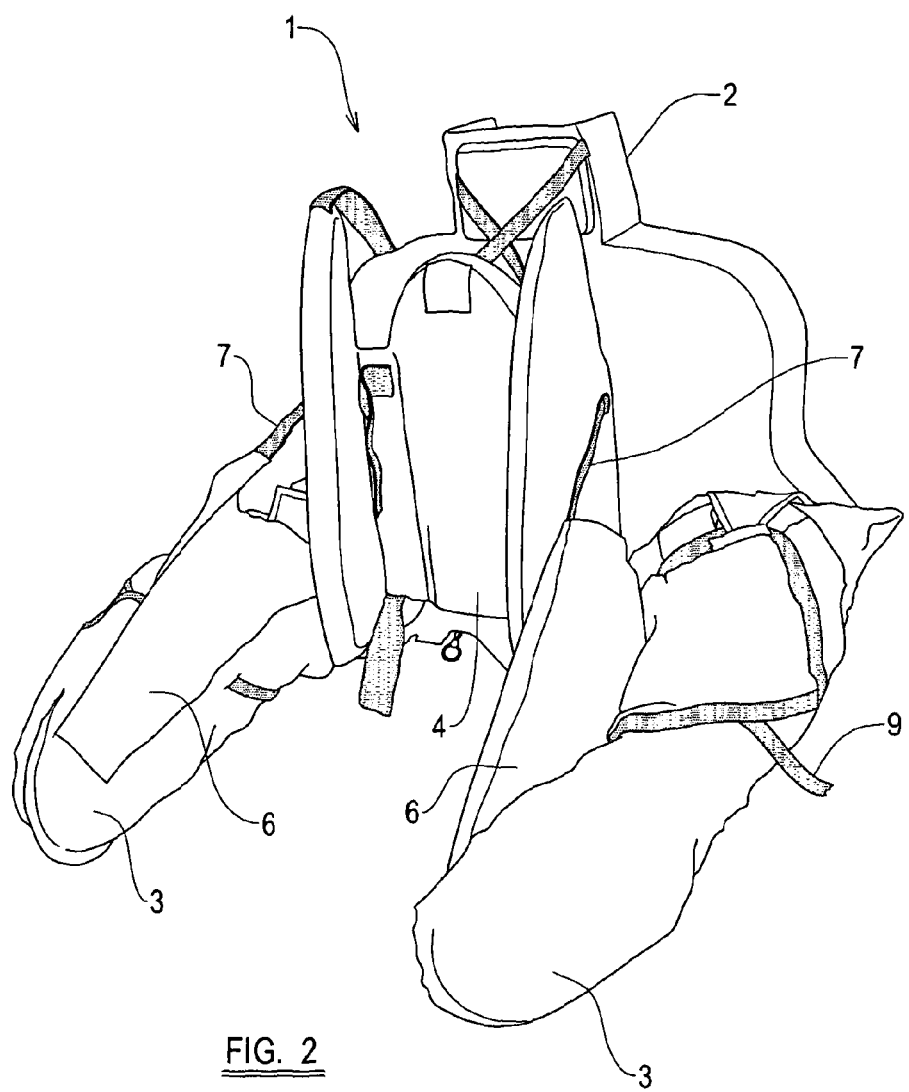
FIG. 2 illustrates the headrest assembly of FIG. 1 with the side beams extended.

The headrest assembly 1 comprises a pair of inflatable side beams 3, which are shown in a stowed configuration in FIG. 1 and in a partially inflated configuration in FIGS. 2 and 3A. FIGS. 3B and 3C show the side beams 3 substantially fully inflated.

The side beams 3 are substantially elongate and attached at one end to the support structure 2. Preferably, the side beams comprises a fabric sheath internally coated with silicone. The end of the side beam 3 attached to the support structure 2 comprises an opening through which the side beam 3 may be inflated. The side beams 3 can be inflated by a compressed gas stored on the ejection seat or by a pyrotechnic gas generator. The side beams 3 are attached to the support structure 2 at a distance apart from one another.

In another embodiment, instead of providing a coated sheath, the side beam may comprise an inflatable bladder provided inside a discrete outer sheath.

During normal operation of an aircraft in which the ejection seat is installed, the side beams 2 are stowed and not inflated (substantially as shown in FIG. 1). The headrest assembly 1 provides a headrest 4 for conventional use. Headrest wings 5 are attached to either side of the headrest 4 and hinge with respect to the headrest 4. In the stowed configuration, the side beams 3 are stowed substantially behind the head rest wings 5. The side beams 3 may be held in their stowed configuration using velcro webbing, which automatically releases under the pressure of inflation of the side beams 3. When the side beams are stowed, the headrest assembly is preferably covered with a removable fabric cover (not shown). The fabric cover conveniently helps to protect the assembly from damage in use, for example spillages, UV light, tears etc. Preferably, the cover is Berry compliant.

The side beams 3 are configured to be inflated from a stowed configuration to a deployed configuration in which the side beams extend from the support panel.

A triangular skirt 6 is attached to each side beam 3. One side of the skirt 6 is attached along a part of the length of the side beam 3. The corner of the skirt 6 (opposite the side attached to the side beam 3) is secured to the support structure 2 by means of a webbing cord 7. As the side beams 3 are inflated, the webbing 7 is pulled taught. It will be appreciated that the combination of the side beams 3 and skirts 6 provide a space in which an occupant's head is captured.

As described above, it is desirable to ensure that an occupant is brought into the optimal position during ejection, to prevent injury.

The headrest assembly 1 of the present invention is operable to deploy through:

(1) a capturing phase, during which the side beams 3 are partially inflated from the stowed configuration such that they extend outwardly and upwardly from the support mounting 2 and away from one another to surround the head of an occupant of the ejection seat; and (2) a retention phase, during which the side beams 3 are fully inflated into a deployed configuration such that they move downwardly and toward each other to capture the head of an occupant of the ejection seat.

During the capturing phase, the side beams 3 effectively sweep and scoop around the occupant's head. The side beams 3 extend away from one another, so as to surround the occupant's head even if out of position.

Next, during the retention phase, the side beams move towards one another once more, so as to move the occupant's head back towards an optimal position in the ejection seat. At the same time, the side beams 3 move downwardly (with respect to the plane of the support structure), capturing and retaining the occupant's shoulders in the seat.

The headrest assembly 1 further comprises a head beam 8, attached between the support structure 2 and the headrest 4. The head beam 8 is inflatable from a stowed configuration, where the headrest 4 is positioned substantially adjacent to and parallel with the support structure 2 (FIG. 2), and a deployed configuration (FIG. 3A-C), wherein the head beam 8 extends outwardly. The bottom edge of the headrest 4 is attached to the support structure 2. As the head beam 8 inflates, the headrest 4 is caused to rotate.

Preferably, the inflation of the head beam 8 is initiated after the inflation of the side beams 3. In one embodiment, the delay is around 0.1 seconds.

When the ejection procedure is initiated, the side beams 3 start to inflate as the ejection seat propulsion force increases. At this point, the propulsion force may not yet have increased significantly in order for the occupant's head to be forced forward. Accordingly, the inflation of the head beam 8 is not initiated until after the occupant's head has moved forward. The purpose of the head beam 8 is not to actively push the occupant's head forward (which could cause injury), but rather to move the headrest 8 forward to provide a support for the occupant's head as the seat enters the windblast. At the point the occupant's head enters the windblast, the occupant's head will hit the extended headrest 4 with only minimal travel, reducing the risk of injury to the occupant.

The webbing 7 is received in apertures at the top corners of the head rest 4 and moveable therealong. Accordingly, with reference to FIGS. 2 and 3, as the head beam 7 is deployed, the headrest 4 travels along the webbing 7.

As shown in FIGS. 2 and 3A, a sacrificial restriction element, such as tear webbing 9, is provided around a portion of the side beam 3 (not shown in FIGS. 3B and 3C). The tear webbing comprises a length of webbing wherein predetermined portions of each end are stitched together to create a loop. As a force is applied to urge the loop apart, the stitching nearest the loop is caused to perish. As the force is maintained or increased, the tear webbing continues to progressively shear along the stitched section. The tear webbing shown in FIGS. 2 and 3A has already been torn. As will be described below, as the side beams 3 are being inflated, the tear webbing 9 restricts and controls the inflation of the side beam 3. The force of inflation causes the sacrificial stitching of the tear webbing 9 to tear, removing the restriction and allowing the side beam 3 to inflate fully. The strength of the tear webbing 9 is selected so as to restrict inflation by a predetermined amount, to configure the optimal inflation characteristics of the headrest assembly 1. Such features, along with the geometry and stitching of the sheath of the side beams 3 allow for the headrest assembly 1 to deploy through the capturing and retention phases.

With reference to FIGS. 4D-4G, the tear webbing is attached (preferably slidably attached) to the side beam 3 at a point 10 along its length. In one embodiment, the tear wedding 9 is slidably attached at the mid point of the side beam 3. As will be described in more detail below, the tear webbing 9 effectively defines two sections of the side beam: 3 a first section 11 adjacent the support mounting 2; and a second section 12 adjacent the first section 11. The end of the second section 12 defines the distal end of the side beam 3.

Moreover, the connection of the tear webbing 9 to the side beam 3 and support structure 2 is selected to control the manner in which the side beam 3 inflates. Preferably, the tear webbing 9 is secured to the support structure 2 on the outer edge of the side beam 3. In other words, the point of the side beam 3 most distant from the other side beam 3.

Preferably, the tear webbing 9 is slidably secured to the side beam 3 on the inner side of the side beam 3, i.e. the part of the side beam 3 facing the other side beam 3.

FIGS. 4A-4G illustrate schematically the deployment of the right hand side beam.

FIG. 4A illustrates a front schematic view of the side beam 3 when stowed, wherein the side beam 3 is collapsed down and folded in on itself.

Upon initiation of inflation, gas is pumped into the side beam 3, passing through the first section 11 and into the second section 12. As a result, the second section 12 begins to inflate, and is caused to unfurl and extend to the right, in the direction of X. See FIGS. 4B and 4C.

Subsequently or at the same time, the first section 11 begins to inflate, but is restrained from fully inflating by the tear webbing 9 being anchored to the support mounting 2. See FIGS. 4D and 4E.

With reference to FIG. 4E, the first 11 and second 12 sections inflate to a pressure which imparts an increasing force on the tear webbing 9. When the force reaches a predetermined level, the stitching of the tear webbing 9 is caused to perish. As the pressure in the first 11 and second 12 sections increases still further, the tear webbing 9 progressively shears.

The tear webbing 9 continues to tear until the point where the side beam 3 has fully inflated. At this point, the tear webbing 9 no longer causes a restriction. It will noted from the schematic view in FIG. 4F that the distal ends of the tear webbing are still attached to one another. Alternatively, the ends of the tear webbing may detach from one another when the side beam 3 is fully inflated In one embodiment, as shown in FIGS. 3B & 3C, the second section 12 of each side beam 3 is configured to extend downwardly with respect to the longitudinal axis of the first section 11 of the side beam 3 in the deployed configuration, to retain an occupant's shoulders with respect to the headrest assembly 1. Preferably, the side beams 3 apply pressure to the occupant's shoulders.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:
1. A headrest assembly for an ejection seat, comprising:
a headrest having a front side and a back side;
a support mounting coupled to the back side of the headrest; and
a pair of inflatable side beams, each attached at one end to the support mounting and spaced apart from one another,
the side beams being configured to be inflated from a stowed configuration, in which the side beams do not extend from the support mounting, to a deployed configuration in which the side beams extend from the support mounting, the side beams configured to deploy through:
a capturing phase, during which the side beams are partially inflated from the stowed configuration such that they extend outwardly and upwardly from the support mounting and away from one another to surround the head of an occupant of the ejection seat toward a central location with respect to the support mounting.

2. A headrest assembly according to claim 1, wherein the side beams are configured to deploy through said capturing phase into a retention phase, during which the side beams are fully inflated into a deployed configuration such that they have moved downwardly and toward each other to capture the head of an occupant of the ejection seat.

3. A headrest assembly according to claim 1, wherein each side beam comprises a first section, adjacent the support structure, and a second section, adjacent the first section, and a sacrificial restriction element is provided at the intersection of the first and second sections.

4. An ejection seat comprising a headrest assembly according to claim 1.

5. A headrest assembly according to claim 1, the headrest is connected to the support mounting by an inflatable head beam, the head beam configured to be inflated from a stowed configuration, in which the headrest is arranged substantially adjacent the support mounting, to a deployed configuration, causing the headrest to extend from the support mounting.

6. A headrest assembly according to claim 5, wherein a lower part of the headrest is hingedly connected to the support structure such that, upon inflation of the head beam, the headrest is angled with respect to the support structure.

7. A headrest assembly according to claim 5, wherein the initiation of inflation of the head beam occurs after the initiation of inflation of the side beams.

8. A headrest assembly according to claim 5, wherein the headrest further includes support wings extending from either side of the headrest.

9. A headrest assembly according to claim 5, wherein the side beams and head support beam are inflated from the same gas source.

10. A headrest assembly according to claim 1, wherein each side beam further comprises a triangular skirt, connected on one side along a section of the side beam, wherein the opposite corner of each skirt is tethered by tethers to the support mounting.

11. A headrest assembly according to claim 10, wherein an upper portion of the headrest is translatable along the tethers.

12. A headrest assembly according to claim 1, wherein each side beam comprises a first section, adjacent the support structure, and a second section, adjacent the first section, wherein, upon inflation of the side beam, the second section is configured to extend downwardly with respect to the longitudinal axis of the first section to retain an occupant's shoulders with respect to the headrest assembly.

13. A headrest assembly according to claim 12, configured such that, when in the deployed configuration, the side beams apply pressure to the occupant's shoulders.

14. A headrest assembly for an ejection seat, comprising:
a support mounting; and
a pair of inflatable side beams, each attached at one end to the support mounting and spaced apart from one another,
the side beams being configured to be inflated from a stowed configuration to a deployed configuration in which the side beams extend from the support mounting, the side beams configured to deploy through:
a capturing phase, during which the side beams are partially inflated from the stowed configuration such that they extend outwardly and upwardly from the support mounting and away from one another to surround the head of an occupant of the ejection seat toward a central location with respect to the support mounting,
wherein each side beam further comprises a triangular skirt, connected on one side along a section of the side beam, wherein the opposite corner of each skirt is tethered by tethers to the support mounting.

15. A headrest assembly according to claim 14, wherein the side beams are configured to deploy through said capturing phase into a retention phase, during which the side beams are fully inflated into a deployed configuration such that they have moved downwardly and toward each other to capture the head of an occupant of the ejection seat.

16. A headrest assembly according to claim 14, wherein an upper portion of the headrest is translatable along the tethers.

17. A headrest assembly according to claim 14, wherein each side beam comprises a first section, adjacent the support structure, and a second section, adjacent the first section, and a sacrificial restriction element is provided at the intersection of the first and second sections.

18. An ejection seat comprising a headrest assembly according to claim 14.

19. A headrest assembly according to claim 14, further comprising a headrest connected to the support mounting by an inflatable head beam, the head beam configured to be inflated from a stowed configuration, in which the headrest is arranged substantially adjacent the support mounting, to a deployed configuration, causing the headrest to extend from the support mounting.

20. A headrest assembly according to claim 19, wherein a lower part of the headrest is hingedly connected to the support structure such that, upon inflation of the head beam, the headrest is angled with respect to the support structure.

21. A headrest assembly according to claim 19, wherein the initiation of inflation of the head beam occurs after the initiation of inflation of the side beams.

22. A headrest assembly according to claim 19, wherein the headrest further includes support wings extending from either side of the headrest.

23. A headrest assembly according to claim 19, wherein the side beams and head support beam are inflated from the same gas source.

24. A headrest assembly according to claim 14, wherein each side beam comprises a first section, adjacent the support structure, and a second section, adjacent the first section, wherein, upon inflation of the side beam, the second section is configured to extend downwardly with respect to the longitudinal axis of the first section to retain an occupant's shoulders with respect to the headrest assembly.

25. A headrest assembly according to claim 24, configured such that, when in the deployed configuration, the side beams apply pressure to the occupant's shoulders.

* * * * *